June 18, 1963    E. D. EICH ETAL    3,094,583
HIGH VOLTAGE ELECTRIC POWER CABLES
Filed March 24, 1959
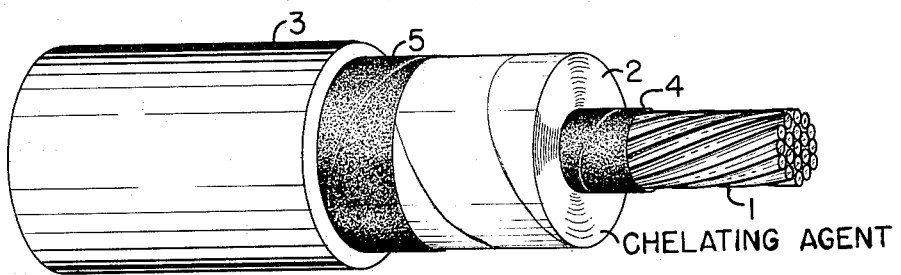
INVENTORS
Edward D. Eich
George Eich III
BY
Pennie Edmonds Morton Barrows & Taylor

United States Patent Office 3,094,583
Patented June 18, 1963

3,094,583
HIGH VOLTAGE ELECTRIC POWER CABLES
Edward D. Eich, Tarrytown, N.Y., and George Feick III, Needham, Mass., assignors, by direct and mesne assignments, to Anaconda Wire and Cable Company, a corporation of Delaware
Filed Mar. 24, 1959, Ser. No. 801,446
3 Claims. (Cl. 174—25)

This invention relates to electric power cables and, more particularly, to power cables having a copper conductor surrounded by insulation which is impregnated with a hydrocarbon cable oil. The invention provides an improved oil-impregnated electric power cable and is based on our discovery that certain organic chelating agents, when incorporated in the cable insulation in which the hydrocarbon cable oil is maintained substantially completely free from both oxidation inhibitors and peroxide decomposers, are capable of minimizing an increase in the power factor of the oil under conditions which normally result in chemical decomposition and impaired dielectric properties. The electric power cable of the invention may be operated at high voltages and over sustained periods of time without danger of oxidative degradation to to the cable oil or appreciable loss of its dielectric properties.

The oxidative degradation which occurs in hydrocarbon oils becomes increasingly serious as the operating voltage of the cable is increased. Progressive deterioration of the cable oil at high voltages acts to depreciate its insulating properties, since oxidative degradation of the oil is frequently if not invariably accompanied by a loss in dielectric strength and a pronounced increase in the power factor of the cable.

In cable engineering, an increase in the measured power factor of the insulating oil serves, under known conditions, as a convenient indication of the dielectric loss in the insulation dissipated by heat. Therefore, it is customary to refer to the power factor of the oil, because, when all characteristics of an alternating current circuit except power factor remain constant, then any increase in the power factor can only be ascribed to the consumption of power in the insulation by dielectric absorption. Consequently, changes in the power factor may be used as a direct indication of the efficiency of the insulation as a dielectric. In the case of oil-impregnated power cables operating at a constant high voltage, deterioration of the insulation is due for the most part to the oxidative degradation of the cable oil which is reflected by an increase in the power factor.

Whether the oxidative degradation of hydrocarbon cable oils is initiated by free radicals or whether this deterioration proceeds through an ionic mechanism is not precisely known, since the addition to cable oils of various antioxidants, such as the oxidation inhibitors which function via a free radical mechanism or the peroxide decomposers which may function by a mechanism involving ions as well as free radicals, neither inhibits oxidation sufficiently nor precludes an increase in the power factor to determine the operative mechanism of oxidative degradation. It has been established, however, that no matter what the additive, the presence of small quantities of ionic copper in the cable oil catalyzes its oxidation and results in an appreciable rise in the power factor of the oil.

Although small quantities of ionic copper catalyze the formation of oxidative degradation products in the oil, it is generally believed that the actual increase in the power factor of the oil which results from this copper-catalyzed oxidation is probably due to the physical presence in the oil of ionic substances, since continuous removal of the ionic substances by adsorption from the oil on a highly adsorbent carbon black minimizes a decrease in the dielectric strength of the oil. To achieve this chemical and hence electrical stability, the structure of many oil-impregnated power cables contain carbon-black paper, generally in the form of carbon-black tapes. These carbon-black tapes are fabricated from wood pulp or manila-rope paper to which carbon-black (colloidal carbon) has been added during the pulping so that the carbon-black is permeated throughout the fiber of the paper. The carbon-black tapes are usually applied over the copper conductor and over the insulation so that both the inner and outer insulation surfaces are in contact with the tape. In this manner, the tape adsorbs the products of oxidative degradation as they form and also shields the conductor against ionization discharges. Nonetheless, prolonged operation of such cables, especially at the high voltages, is invariably accompanied by a slow but appreciable rise in the power factor of the cable oil.

Using a highly refined unblended naphthenic-base mineral oil which is very susceptible to oxidation in the presence of ionic copper, we have discovered that by incorporating in such oil, or in paper insulation impregnated with the oil, a small amount of an organic chelating agent capable of forming a coordination compound with divalent copper, while maintaining the oil substantially completely free of both oxidation inhibitors and peroxide decomposers, it is possible to minimize any increase in the power factor of the oil when the oil is subjected to limited oxidation in the presence of copper. Particular care must be taken to insure that the chelating agent is employed in conjunction with cable oils which are maintained free from both oxidation inhibitors and peroxide decomposers, for we have found that the presence in the oil of either or both of these latter additives in conjunction with the chelating agent actually promotes rather than minimizes an increase in the power factor and induces rather than hinders oxidative degradation of the oil. Whatever stabilizing influence is exerted by the organic chelating agent appears to be substantially negated when either oxidation inhibitors or peroxide decomposers are also added to the oil; these latter compounds, therefore, act as antagonists to the organic chelating agent. When, however, the chelating agent is employed in cable insulation in which the cable oil is maintained free of both types of antioxidants, the oil may be subjected to limited oxidation conditions without undergoing substantial increase in power factor. Power cables in which the insulation is impregnated with this oil may be operated at very high voltages without danger of early deterioration of its dielectric properties.

Based on these discoveries, the present invention provides an improved high voltage electric power cable in which a copper conductor is surrounded by insulation impregnated with a hydrocarbon oil, the insulation containing a small quantity of an organic chelating agent capable of forming a coordination compound with divalent copper. The oil, however, is maintained substantially completely free from both oxidation inhibitors and peroxide decomposers. Both oil-soluble and oil-insoluble chelating agents may be used, the former by dissolving the chelating compound in the hydrocarbon cable oil, and the latter by incorporating the chelating compound in at least one of the paper tapes generally used to insulate the conductor.

The single FIGURE of the accompanying drawing is a sectionalized perspective of a power cable embodying the teachings of this invention.

The cable shown in the drawing comprises a copper conductor 1 insulated with a plurality of layers 2 of paper insulation and enclosed in a cylindrical lead sheath 3. Directly over the conductor 1 is wrapped a layer 4 of paper containing a dispersion of particles of absorbent carbon black, and another layer 5 of absorbent carbon black paper is wrapped over the outermost of the layers of paper insulation 2. The paper insulation 2 is impregnated with a hydrocarbon insulating oil. Either the oil or the paper insulation 2 or both are treated with a chelating agent as herein described.

Although only one type of power cable is shown in the accompanying drawing, cables fabricated in accordance with the invention may be of any of the usual types, including the solid type, the oil-filled type, the gas-filled type, and the gas-pressure type. In the solid type, many layers of a thin tape of paper are applied to the conductor and the taped cable thereafter is impregnated with oil containing the chelating agent. The resultant oil-impregnated insulation is then encased in a lead sheath. Alternatively, paper tape on which an oil-insoluble chelating agent has been precipitated or paper tape impregnated with an oil-insoluble chelating agent may be used together with untreated tapes to insulate the conductor so that at least one of the layers of tape surrounding the conductor contains the oil-insoluble chelating agent, or it may be used as the sole paper insulation in the cable. In the oil-filled type of cable, channels inside the cable sheath are filled with the oil and kept full by connection to an oil reservoir maintained under pressure. In the gas-filled type of cable, the insulation is impregnated with oil, and after draining out excess oil, a dry inert gas which is maintained under pressure is introduced into the sheathed cable. In a gas-pressure cable, a tightly sheathed oil-insulated cable is placed in a pressure-tight housing and subjected to inert gas at quite high pressure.

The oil-insoluble chelating agents may also be used in oil-impregnated power cables containing carbon-black paper, in which case the chelating agent is preferably introduced into the carbon-black tape prior to manufacturing the cable. Power cables containing carbon black also include the solid type of cable, in which carbon-black tapes containing the oil-insoluble chelating agent are applied over the conductor and over the paper insulation so that both the inner and outer insulation surfaces are in contact with them. The total paper thickness, including the carbon-black tapes, is the same as the specified insulation thickness in standard paper-insulated cables. The taped cable is impregnated with a hydrocarbon oil free from both oxidation inhibitors and peroxide decomposers, and the oil-impregnated insulation then encased in a lead sheath.

Various types of hydrocarbon oils may be employed in the power cables of this invention. In general, these oils are isolated from petroleum distillates and are classified as naphthenic-base mineral oils. Although the oils may be blended with a purified rosin or with a high molecular weight polymer, such as polyisobutylene, the unblended mineral oils are preferred for most purposes, since in general they are more resistant to decomposition and have better dielectric properties than the blended oils.

Any organic chelating agent which is capable of forming a coordination compound with divalent copper may be selected for inclusion in the cable insulation. We have obtained particularly satisfactory results, however, using an organic chelating agent which complexes with divalent copper to form a non-ionic quadridentate coordination compound.

These latter chelating agents are either bidentate or quadridentate reagents, since both classes of compounds complex with divalent copper to form quadridentate structures. In the nomenclature of coordination chemistry, the term bidentate is commonly used to designate those compounds (chelating agents) which contribute two points of attachment to the metal being complexed; the term quadridentate, on the other hand, is applied to those chelating agents which contribute four points of attachment to the sequestered metal. Divalent copper has a coordination number of four, and consequently it may form a quadridentate complex either by binding two molecules of a bidentate chelating agent or by complexing with a single molecule of a quadridentate reagent.

Where the chelating agent is a bidentate compound, such as N-salicylidene methylamine, the quadridentate coordination compound formed with divalent copper may be represented as having the following structure:

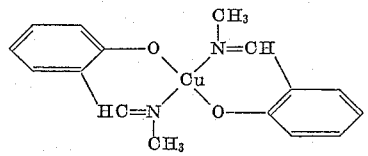

In the case of a quadridentate chelating agent, such as N,N'-disalicylidene-1,2-propanediamine, the coordination compound formed with divalent copper has a quadridentate structure which is illustrated by the following formula:

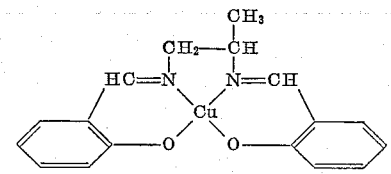

The bidentate and quadridentate chelating agents may be either oil-soluble, in which event the chelating compound is dissolved in the cable oil, however employed, or oil-insoluble, in which event the chelating agent is incorporated in the paper tape insulation. Among the oil-soluble chelating agents, we have obtained particularly satisfactory results using oil-soluble Schiff bases (asomethines) formed by reacting an aromatic o-hydroxybenzaldehyde and a vicinal diamine as quadridentate chelating agents in cable oil according to this invention. Chelating agents from among these Schiff bases which have been found to be especially satisfactory are the N,N'-disalicylidene derivatives of ethylenediamine, 1,2-propanediamine and o-phenylenediamine. The oil-insoluble chelating agents which we have found to be particularly satisfactory for use in cable insulation in accordance width the invention include α-pyrrolaldehyde imine, phthalocyanine and structurally related porphyrins, especially the protoporphyrins.

Theoretically, the concentration of chelating agent initially added to the cable insulation is dependent upon the total concentration of divalent copper which is expected to form over the operating life of the cable. The rate at which cupric ions form at the surface of the conductor and then migrate into the surrounding dielectric is, of course, a function of several variables, including the cable temperature as well as the strength of the electric field. Generally, the higher the intended operating voltages, the greater will be the expected concentration of divalent copper in the cable oil. In practice, a large excess of chelating agent is used in the cable insulation. This excess may be from twofold to as high as a hundredfold over the amount theoretically required to sequester all of the divalent copper which will form over the life of the cable. Consequently, these chelating agents may be used over a very wide range of concentrations. For most high voltage cables, we prefer to use the chelating agents in an amount in the range of from 0.01 to 0.1 percent by weight of the cable oil in the case of oil-soluble chelating agents, or of the paper tape in the case of oil-insoluble chelating agents.

The chelating agent has been found to function effectively only in insulation in which the hydrocarbon cable oils are substantially completely free from both oxidation inhibitors and peroxide decomposers. As indicated previously, the presence in the oil of either or both of these latter antioxidants in conjunction with a chelating agent acts to promote rather than to minimize an increase in the power factor of the oil under limited oxidation conditions. In general, the oxidation inhibitors structurally are either hindred phenols, such as di-t-butyl-p-cresol and the bis-phenols, or substituted aromatic amines, such as N,N'-di-s-butyl-t-phenylenediamine. The peroxide decomposers may have a variety of structures, but generally contain sulfur. Such compounds as di-tetradecyl sulfide, dodecyl mercaptan and 4,4'-thio-bis-(6-t-butyl-3-methylphenol) are representative examples, respectively, of those alkyl sulfides, mercaptans and thiobisphenols which function as peroxide decomposers. To determine whether an antioxidant is either an oxidation inhibitor or a peroxide decomposer, a convenient test has been devised based on the effect of the antioxidant on the decomposition of a solution containing α,α-dimethylbenzyl hydroperoxide (cumene hydroperoxide). If the antioxidant decreases the normal rate of decomposition of the hydroperoxide, producing a variety of products but no phenol, then the antioxidant may be classified as an oxidation inhibitor. But if the antioxidant accelerates the normal rate of decomposition of the hydroperoxide and produces phenol, then it is designated as a peroxide decomposer.

By themselves, the oxidation inhibitors and the peroxide decomposers decrease the rate at which oxygen is absorbed by a hydrocarbon cable oil, but we have found that in the presence of divalent copper and a chelating agent these antioxidants actually increase the rate of oxidative degradation which occurs in the oil, thereby resulting in an increase in the power factor of the oil. Consequently, neither the oxidation inhibitors nor the peroxide decomposers may be present in a hydrocarbon cable oil which according to this invention contains a chelating agent or is employed to impregnate paper tapes containing a chelating agent, for both classes of antioxidants are antagonists to the effect exerted by the chelating agent.

To illustrate the applicabiltiy of incorporating an oil-soluble chelating agent in a hydrocarbon cable oil in accordance with the invention, Table I summarizes the maximum power factor increases which occurred when a highly-refined unblended naphthenic-base mineral oil was subjected to limited oxidation in the presence of copper and various additives. In each example, the hydrocarbon oil was subjected to a concentration corresponding to 6 cc. of oxygen per 60 ml. of oil at a temperature of 85° C. for periods of time ranging up to 700 hours. The maximum percent increase in power factor was determined. The limited oxidation was conducted both in the absence of copper and then in the presence of copper (15 sq. in. of copper foil in 60 ml. of oil) alone and with an oil-soluble chelating agent.

TABLE I

*Limited Oxidation of Hydrocarbon Cable Oil*

| Oxidation Conditions | Maximum Increase in Power Factor (Percent) |
| --- | --- |
| Absence of copper | 0.10 |
| Presence of copper | 1.75 |
| Copper plus N,N'-Disalicylidene-1,2-propanediamine (0.06%) | 0.10 |

As shown in Table I, the use of the chelating agent (N,N'-disalicylidene-1,2-propanediamine) prevented an appreciable increase in the power factor even when copper was present.

The chelating agent only functions to minimize an increase in the power factor when the oil is substantially completely free from both oxidation inhibitors and peroxide decomposers. Table II sets forth the results achieved when the hydrocarbon oil was subjected to identical oxidation conditions as before, but in the presence of copper and a combination of additives.

TABLE II

*Copper-Catalyzed Oxidation of Hydrocarbon Cable Oil*

| Oxidation Conditions | Maximum Increase in Power Factor (Percent) |
| --- | --- |
| N,N'-Disalicylidene-1,2-propanediamine (0.06%) <br> Di-s-butyl-p-phenylenediamine (0.1%) | 1.0 |
| N,N'-Disalicylidene-1,2-propanediamine (0.06%) <br> Dodecyl mercaptan (0.06%) | 1.0 |
| N,N'-Disalicylidene-1,2-propanediamine (0.06%) <br> Di-s-butyl-p-phenylenediamine (0.1%) <br> Dodecyl mercaptan (0.6%) | 5.7 |

A comparison of the experimental results tabulated in Tables I and II demonstrates the marked advantage of incorporating the chelating agent in a cable oil which is maintained substantially completely free from oxidation inhibitors and peroxide decomposers. Cables impregnated with oil containing only the chelating agent may be operated at very high voltages for prolonged periods of time without suffering serious deterioration of the dielectric properties.

Although the foregoing examples demonstrate the marked advantages in incorporating the chelating agent in cable oil, similar advantages are also obtained when the chelating agent is employed in the insulating oils of other types of high-voltage electrical apparatus, such as transformers, circuit breakers, capacitors, and bushings. For example, by incorporating a chelating agent, such as an oil-soluble Schiff base formed from an aromatic o-hydroxy-aldehyde and a vicinal diamine, in the hydrocarbon oil insulation surrounding the copper conductors in a transformer while maintaining the oil substantially completely free from both oxidation inhibitors and peroxide decomposers, it is possible to minimize any increase in the power factor of the hydrocarbon oil during operation of the transformer at very high voltages. Consequently, the invention is applicable to the use of chelating agents in any type of high-voltage electrical apparatus in which copper conductors are surrounded by hydrocarbon oil insulation.

We claim:

1. In a high voltage electric power cable comprising a copper conductor surrounded by insulation which is impregnated with a hydrocarbon oil, the improvement which comprises incorporating in the oil from 0.01 to 0.1 percent by weight, based on the weight of the oil, of an oil-soluble Schiff base formed from an aromatic o-hydroxyaldehyde and a vicinal diamine while maintaining the oil completely free from both oxidation inhibitors and peroxide decomposers, thereby minimizing an increase in the power factor of the oil during operation of the cable.

2. In a high voltage electric power cable comprising a copper conductor surrounded by insulation which is impregnated with a hydrocarbon oil, the improvement which comprises incorporating in the oil from 0.01 to 0.1 percent by weight, based on the weight of the oil, of N,N'-disalicylidene-1,2-propanediamine while maintaining the oil completely free from both oxidation inhibitors and peroxide decomposers, thereby minimizing an increase in the power factor of the oil during operation of the cable.

3. In high voltage electrical apparatus in which copper conductors are surrounded by insulation comprising a hydrocarbon oil, the improvement which comprises incorporating in the oil from 0.01 to 0.1 percent by weight, based on the weight of the oil, of an oil-soluble Schiff base formed from an aromatic o-hydroxyaldehyde and a vicinal diamine while maintaining the oil completely free from both oxidation inhibitors and peroxide decomposers, thereby minimizing an increase in the power factor of the oil during operation of the apparatus.

References Cited in the file of this patent

UNITED STATES PATENTS

| | | |
|---|---|---|
| 2,102,129 | Rosch | Dec. 14, 1937 |
| 2,181,121 | Downing | Nov. 28, 1939 |
| 2,282,513 | Downing | May 12, 1942 |
| 2,465,296 | Swiss | Mar. 22, 1949 |
| 2,525,473 | Berberich et al. | Oct. 10, 1950 |
| 2,637,636 | Walters | May 5, 1953 |
| 2,868,730 | Wood-Mallock et al. | Jan. 13, 1959 |
| 2,892,166 | Sloat et al. | June 23, 1959 |

OTHER REFERENCES

Industrial and Engineering Chemistry (publication), May 1949, vol. 41, No. 5, pp. 918–923.

Publication I "An Introduction to Organic Chemistry," by A. Lowy, B. Harrow and P. M. Apfelbaum. Published by John Wiley & Sons, Inc., New York, New York (1946), pages 384–385 relied on.